United States Patent [19]

Nilssen

[11] Patent Number: 5,032,782

[45] Date of Patent: * Jul. 16, 1991

[54] SERIES-CONNECTED POWER-LINE CONTROLLER

[76] Inventor: Ole K. Nilssen, Caesar Dr., Barrington, Ill. 60010

[*] Notice: The portion of the term of this patent subsequent to May 8, 2007 has been disclaimed.

[21] Appl. No.: 419,259

[22] Filed: Oct. 10, 1989

Related U.S. Application Data

[63] Continuation-in-part of Ser. No. 224,178, Jul. 22, 1988, Pat. No. 4,924,150, which is a continuation of Ser. No. 7,481, Jan. 28, 1987, abandoned.

[51] Int. Cl.$^5$ ............................................. H05B 37/00
[52] U.S. Cl. ..................................... 323/239; 323/324; 315/174
[58] Field of Search .............. 315/171, 172, 173, 174, 315/175, 176, 194, 224, 225, 243, 244, 246, 307, 308, DIG. 5, DIG. 7; 323/239, 324; 363/125, 127, 128

[56] References Cited

U.S. PATENT DOCUMENTS

| | | | |
|---|---|---|---|
| 3,525,015 | 8/1970 | Kita | 315/194 |
| 3,825,814 | 7/1974 | Pelly | 363/41 |
| 4,352,045 | 9/1982 | Widmayer | 315/240 |
| 4,528,457 | 7/1985 | Keefe et al. | 363/132 |
| 4,644,228 | 2/1987 | Nilssen | 363/50 |
| 4,692,681 | 9/1987 | Nilssen | 323/347 |
| 4,695,934 | 9/1987 | Steigerwald et al. | 363/17 |
| 4,743,834 | 5/1988 | Rice | 323/239 |
| 4,887,201 | 12/1989 | Nilssen | 363/132 |
| 4,924,150 | 5/1990 | Nilssen | 315/244 |
| 4,933,831 | 6/1990 | Takahashi et al. | 363/132 |

FOREIGN PATENT DOCUMENTS 0851708 1/1979 U.S.S.R. .

Primary Examiner—Steven L. Stephan
Assistant Examiner—Jeffrey Sterrett

[57] ABSTRACT

A full-bridge transistor inverter is connected at its DC supply-side with an energy-storing capacitor. The inverter's output terminals are connected in series between a source of AC voltage and a load; which load may be an electric motor, a fluorescent lighting system, etc. By controllably switching the transistors of the inverter ON and OFF at some rate higher than, but basically synchronous with, the frequency of the AC voltage, effective control of the flow of power between the AC source and the load is achieved. DC voltage on the energy-storing capacitor is obtained from the AC source and established by way of the timing of the switching action of the inverter.

Hence, in contrast with the ordinary situation where an inverter is supplied with net power from its source of DC voltage and where this net power is then supplied to a load connected with the inverter's output, the present invention relates to a situation where generally no net power is supplied to the inverter from its source of DC voltage and where generally no net power is supplied from the inverter's output. Instead, the inverter is used for controlling the waveform, magnitude and phasing of the alternating current flowing through it by way of its output terminals.

27 Claims, 4 Drawing Sheets

SERIES-CONNECTED POWER-LINE CONTROLLERRELATION APPLICATIONS

This application is a continuation-in-part of application Ser. No. 07/224,178 filed Jul. 22, 1988, 4,924,150; which is a continuation of application Ser. No. 07/007,481 filed Jan. 28, 1987, now abandoned.

BACKGROUND OF THE INVENTION

1. Field of the Invention

The present invention relates to a two-terminal means by which to control the flow of power between a source of AC voltage and a load, particularly in situations wherein the load comprises an inductive component.

2. Elements of Prior Art

At present, the most commonly used two-terminal means for controlling the flow of power between an AC source and a load is that of a phase-controlled Triac, such as is used in most ordinary light dimmers.

However, when the load comprises a significant inductive component, such as is typically the case with a load consisting of an electric motor or a fluorescent lighting system, the ordinary series-connected two-terminal Triac controller is not very effective. In fact, due to reasons of poor power factor, the ordinary phase-controlled Triac is not that appropriate even for most resistive loads.

SUMMARY OF THE INVENTION

Objects of the Invention

An object of the present invention is that of providing for means by which to control the flow of power between a source of AC voltage and a load.

This as well as other objects, features and advantages of the present invention will become apparent from the following description and claims.

Brief Description

In its preferred embodiment, the present invention constitutes a control means having but two terminals and being operable: i) to be connected in series between a source of AC voltage and a load, and ii) adjustably to control the flow of power between this source of AC voltage and the load.

The control means comprises a full-bridge transistor inverter having its bridge output connected directly with the two terminals of the control means. A commutation transistor is parallel-connected with each transistor of the bridge inverter. The inverter's DC supply side is connected with an energy-storing capacitor; which capacitor is comprised within the control means.

By controllably switching the transistors of the inverter ON and OFF at a relatively high frequency, effective control of the flow of current between the AC source and the load is achieved. DC voltage on the energy-storing capacitor is obtained from the AC source and established by way of the timing of the switching action of the inverter.

Hence, in contrast with the ordinary situation where an inverter is supplied with net power from a source of DC voltage and where this net power is then supplied to a load connected with the inverter's output, the present invention relates to a situation where generally no net power is supplied to the inverter from its source of DC voltage and where generally no net power is supplied from the inverter's output. Instead, on an on-going instantaneous basis, by selectably adding/subtracting the DC voltage on the energy-storing capacitor to/from the line voltage, the inverter is used for controlling the waveshape, magnitude and phasing of the alternating current flowing through its output terminals.

In an example, the present invention is used for controlling the waveshape of the current flowing between an ordinary 277 Volt/60Hz electric utility power line and a fluorescent lighting system, thereby either: (i) to improve the current crest-factor and thereby the overall luminous efficacy of the lighting system; and/or (ii) to adjust the light output of the lighting system.

In this, as well as in other applications, as long as the load comprises a significant inductive component (which, if absent, may be supplied by way of adding an inductance means in series with the control terminals), subject control means effectively permits modifying the voltage provided to the load such as to cause the resulting load current to be of nearly any desired waveshape, magnitude, phasing and/or frequency.

DESCRIPTION OF THE PREFERRED EMBODIMENT

Details of Construction

Figure 1:
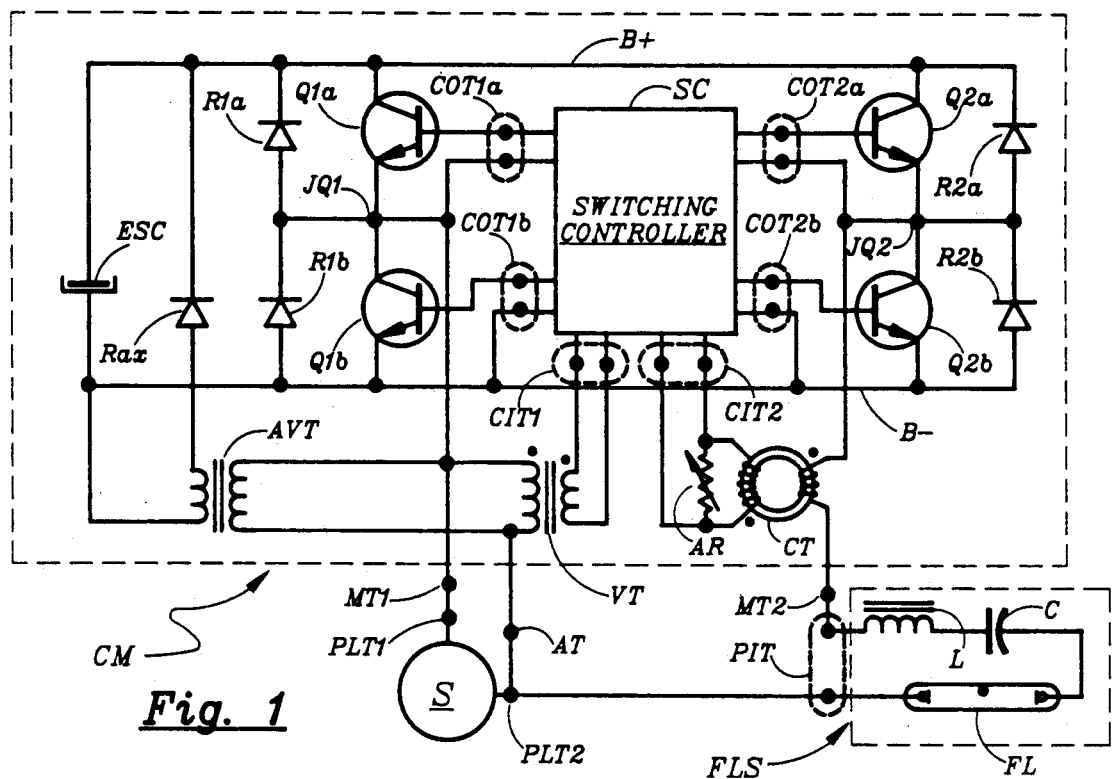
FIG. 1 schematically illustrates a three-terminal embodiment of the control means of the present invention.

In FIG. 1, a source S provides a 277 Volt/60 Hz voltage between power line terminals PLT1 and PLT2; which power line terminals are connected with power input terminals PIT of a fluorescent lighting system FLS by way of main terminals MT1 and MT2 of control means CM; terminal MT1 being connected directly with terminal PLT1.

Fluorescent lighting system FLS is represented as a series-combination of an inductor L, a capacitor C, and a fluorescent lamp FL.

Inside control means CM is an energy-storing capacitor ESC connected between a B+ bus and a B− bus.

A first transistor Q1a is connected with its collector to the B+ bus and with its emitter to a first junction JQ1; a second transistor Q1b is connected with its collector to junction JQ1 and with its emitter to the B− bus; a third transistor Q2a is connected with its collector to the B+ bus and with its emitter to a junction JQ2; and a fourth transistor Q2b is connected with its collector to junction JQ2 and with its emitter to the B− bus.

A first rectifier R1a is connected with its cathode to the B+ bus and with its anode to junction JQ1; a second rectifier R1b is connected with its cathode to junction JQ1 and with its anode to the B− bus; a third rectifier R2a is connected with its cathode to the B+ bus and with its anode to junction JQ2; and a fourth rectifier R2b is connected with its cathode to junction JQ2 and with its anode to the B− bus.

Main terminal MT1 is connected directly with junction JQ1; and main terminal MT2 is connected with junction JQ2 by way of the primary winding of a current transformer CT.

A switching controller SC has four pairs of control output terminals: COT1a, COT1b, COT2a and COT2b.

Control output terminals COT1a are connected across the base-emitter junction of transistor Q1a; control output terminals COT1b are connected across the base-emitter junction of transistor Q1b; control output terminals COT2a are connected across the base-emitter junction of transistor Q2a; and control output terminals COT2b are connected across the base-emitter junction of transistor Q2b.

Switching controller AC also has two pairs of control input terminals: CIT1 and CIT2.

Control input terminals CIT2 are connected across the secondary winding of current transformer CT, as is also an adjustable resistor AR. Control input terminals CIT1 are connected across the secondary winding of a voltage transformer VT, whose primary winding is connected between main terminal MT1 and an auxiliary terminal AT; which auxiliary terminal is connected directly with power line terminal PLT2.

An auxiliary voltage transformer AVT is connected with its primary winding between auxiliary terminal AT and main terminal MT1. Its secondary winding is connected between the B− bus and the anode of an auxiliary rectifier Rax. The cathode of rectifier Rax is connected with the B+ bus.

Figure 2:
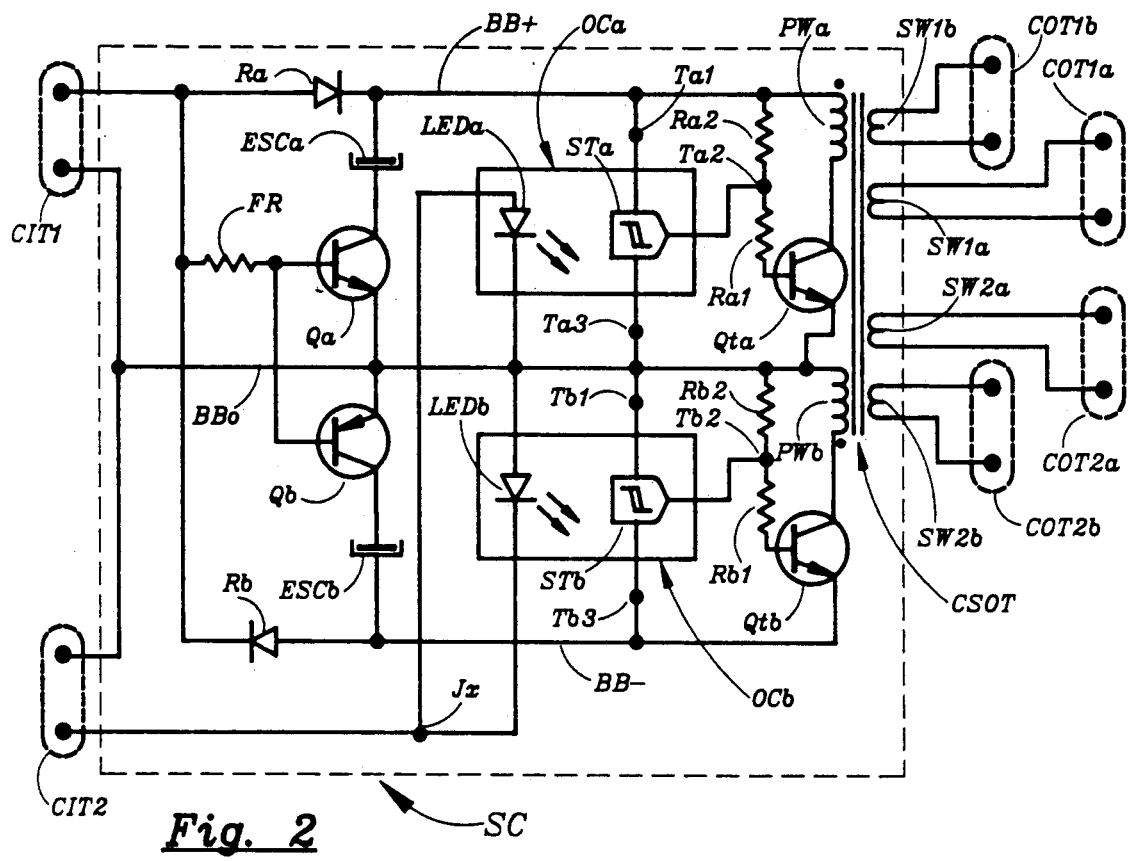
FIG. 2 schematically illustrates the programmer means used in the control means of FIG. 1.

FIG. 2 illustrates details of switching controller SC of FIG. 1.

In FIG. 2, one of control input terminals CIT1 is connected with with a neutral bus BBo; the other of control input terminals CIT1 is connected with the anode of a first rectifier Ra as well as with the cathode of a second rectifier Rb. The cathode of rectifier Ra is connected with a positive bus BB+; and the anode of rectifier Rb is connected with a negative bus BB−.

A first energy-storing capacitor ESCa is connected between the BB+ bus and the collector of an NPN transistor Qa, whose emitter is connected with the BBo bus. The base of transistor Qa is connected to the anode of rectifier Ra by way of a fixed resistor FR.

A second energy-storing capacitor ESCb is connected between the BB− bus and the collector of a PNP transistor Qb, whose emitter is connected with the BBo bus. The base of transistor Qa is directly connected with the base of transistor Qb.

A first opto-coupler OCa comprises a first light-emitting diode LEDa and a first Schmitt trigger STa; and a second opto-coupler OCb comprises a second light-emitting diode LEDb and a second Schmitt trigger STb.

Light-emitting diode LEDa is connected with its cathode to the BBo bus and with its anode to a junction Jx. Light-emitting diode LEDb is connected with its anode to the BBo bus and with its cathode to junction Jx.

Control input terminals CIT2 are connected between the BBo bus and junction Jx.

Schmitt trigger STa has three terminals: Ta1, Ta2 and Ta3; and Schmitt trigger STb has three terminals: Tb1, Tb2 and Tb3. The outputs from Schmitt triggers STa and STb are provided between terminal pairs Ta2/Ta3 and Tb2/Tb3, respectively.

Terminal Ta1 is connected with the BB+ bus; terminal Ta2 is connected with the base of a transistor Qta by way of a resistor Ra1; and terminal Ta3 is connected with the BBo bus. A resistor Ra2 is connected between terminals Ta1 and Ta2.

Terminal Tb1 is connected with the BBo bus; terminal Tb2 is connected with the base of a transistor Qtb by way of a resistor Rb1; and terminal Tb3 is connected with the BB− bus. A resistor Rb2 is connected between terminals Tb1 and Tb2.

A control signal output transformer CSOT has first and second primary windings PWa and PWb. Primary winding PWa is connected between the BB+ bus and the collector of transistor Qta; and primary winding PWb is connected between the BBo bus and the collector of transistor Qtb.

Transformer CSOT has four secondary windings: SW1a, SW1b, SW2a and SW2b. Secondary winding SW1a is connected with control output terminals COT1a; secondary winding SW1b is connected with control output terminals COT1b; secondary winding SW2a is connected with control output terminals COT2a; and secondary winding SW2b is connected with control output terminals COT2b.

Figure 3:
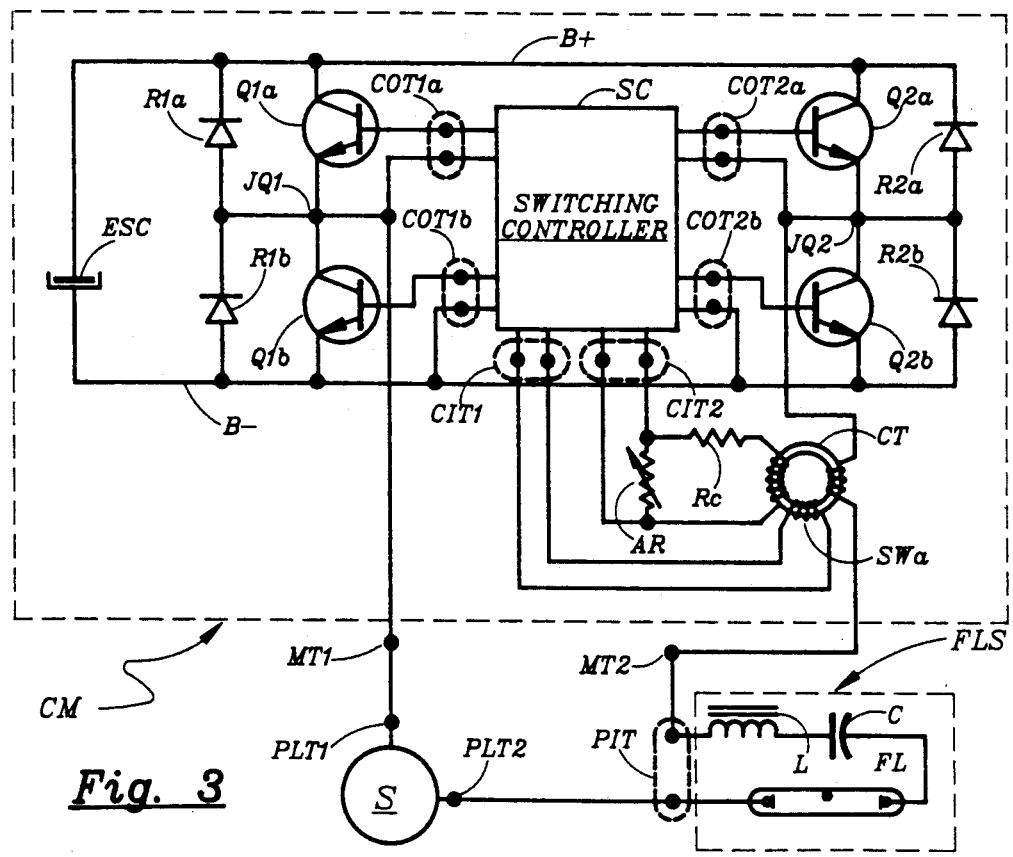
FIG. 3 schematically illustrates a two-terminal embodiment of the control means.

FIG. 3 is the same as FIG. 1 except for: i) the addition of a resistor Rc in series with the original secondary winding of current transformer CT, and ii) the elimination of auxiliary voltage transformer AVT, auxiliary rectifier Rax, auxiliary terminal AT, and voltage transformer VT.

In FIG. 3, instead of being obtained from voltage transformer VT, the AC voltage required at control input terminals CIT1 of switching controller SC is provided from an additional secondary winding SWa on current transformer CT.

Figure 5:
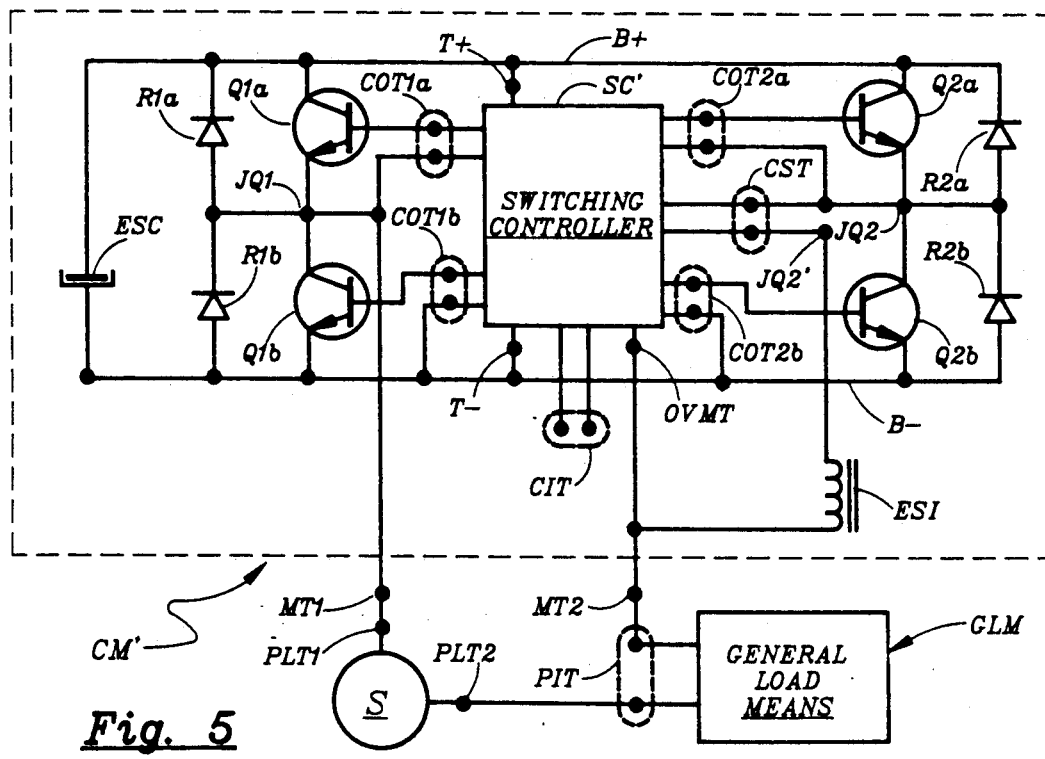
FIG. 5 schematically illustrates the preferred embodiment of the invention.

FIG. 5 represents the most basic and generally preferred embodiment of the invention.

The arrangement of FIG. 5 is similar to that of FIG. 3 except for: i) the substitution of control input terminals CIT1 and CIT2 of switching controller SC with a single pair of control input terminals CIT; ii) the addition of a T− and a T+ terminal; iii) the addition of a pair of current-sensing terminals CST, which are connected between junction JQ2 and a junction JQ2'; iv) the substitution of an energy-storing inductor ESI for the primary winding of current transformer CT; v) the addition of an output voltage monitoring terminal OVMT connected with main terminal MT2; and vi) the substitution of a general load means GLM for fluorescent lighting system FLS.

In FIG. 5, the overall control means is referred-to as CM'; and the modified switching controller is referred-to as SC', whose T− terminal is connected with the B− bus and whose T+ terminal is connected with the B+ bus.

Details of Operation

Figure 4:
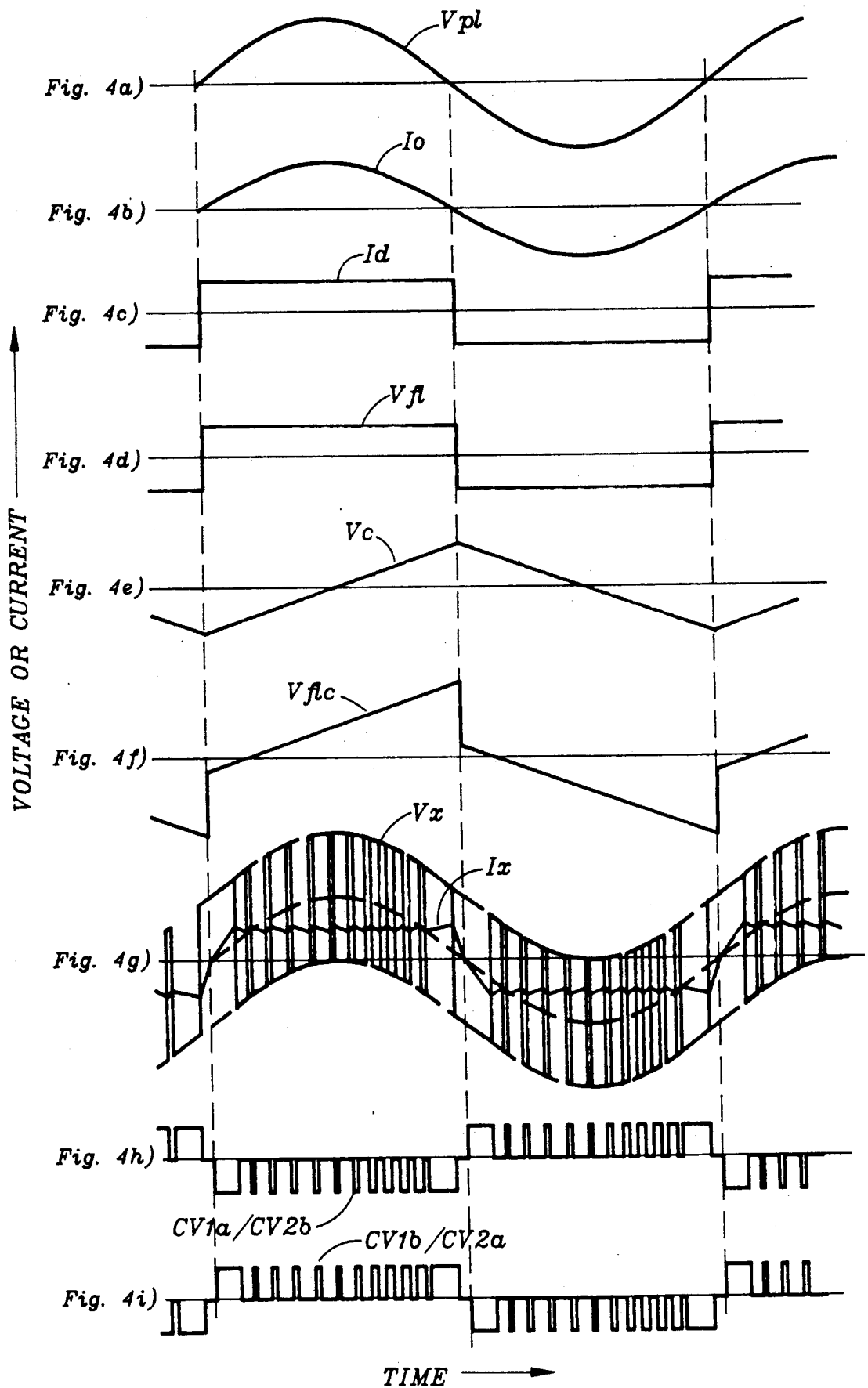
FIG. 4 illustrates various voltage and current waveforms associated with the control means of FIGS. 1 and 3.

The operation of the circuits of FIGS. 1, 2 and 3 may best be understood when reading the following explanation in light of the waveforms illustrated by FIG. 4.

In FIG. 4a, the waveform identified as Vp1 represents the voltage provided by the power line voltage source S of FIG. 1.

In FIG. 4b, the waveform identified as Io represents the current flowing into power input terminals POT of fluorescent lighting system FLS of FIG. 1 whenever control means CM provides for a continuous short circuit between main terminals MT1 and MT2. Thus, the waveform of FIG. 4b represents the current that would have been flowing from power line source S and into the fluorescent lighting system if control means CM were to have been replaced with a short circuit.

In FIG. 4c, the waveform identified as Id represents the desired waveform for the current flowing into power input terminals POT of fluorescent lighting system FLS, and thereby through inductor L, capacitor C and fluorescent lamp FL.

In FIG. 4d, the waveform identified as Vfl represents the voltage across fluorescent lamp FL resulting from the current of FIG. 4c.

In FIG. 4e, the waveform identified as Vc represents the voltage across capacitor C resulting from the current of FIG. 4c.

In FIG. 4f, the waveform identified as Vflc represents the sum of the voltages present across fluorescent lamp FL and capacitor C; which is to say: the sum of the voltages depicted by FIGS. 4d and 4e.

In FIG. 4g, the waveform identified as Vx represents a voltage that, if provided across power input terminals PIT of fluorescent lighting system FLS, would give rise to a current therethrough having the waveshape indicated by IX.

Thus, the actual current (Ix) flowing into the fluorescent lighting system (FLS) in response to the net voltage (Vx) provided across power input terminals PIT fairly well approximates the desired waveform as depicted in FIG. 4c; which implies that the graphic representations of FIGS. 4d, 4e and 4f are all reasonable approximations of the actual waveforms.

In FIG. 4h, the waveform identified as CV1a/CV2b represents both the control voltages provided by switching controller SC at its control output terminal pairs COT1a and COT2b; which are the control voltages provided to the base-emitter junctions of transistors Q1a and Q2b.

In FIG. 4i, the waveform identified as CV1b/CV2a represents both the control voltages provided by switching controller SC at its control output terminal pairs COT1b and COT2a; which are the control voltages provided to the base-emitter junctions of transistors Q1b and Q2a.

Now, with reference to the waveforms of FIG. 4 and the circuit diagram of FIG. 2, the operation of the power line control means of FIG. 1 may be explained as follows.

In FIG. 1, the current flowing into the fluorescent lighting system FLS also flows through the primary winding of current transformer CT. Thus, the secondary winding of current transformer CT provides a secondary current of instantaneous magnitude proportional to that of the current flowing into fluorescent lighting system FLS.

Except for an adjustable amount shunted away by adjustable resistor AR, this secondary current flows into control input terminals CIT2 of switching controller SC and through one or the other of light-emitting diodes LEDa/LEDb, thereby causing the one or the other of these diodes to emit (infrared) light of intensity roughly proportional to the magnitude of the current flowing into fluorescent lighting system FLS.

For a situation where load current is flowing from power line terminal PLT1, into main terminal MT1, out of main terminal MT2, through fluorescent lighting system FLS, and back to power line terminal PLT2, the polarities of the windings of transformers CT and VT are so arranged as to provide: i) for the voltage present at the anode of rectifier Ra to be positive with respect to the BBo bus, which means that transistor Qa receives forward base bias, thereby to be rendered conductive (which means that transistor Qb will be rendered non-conductive), and ii) for the secondary current from current transformer CT to flow through light-emitting diode LEDa, thereby to cause coupling with Schmitt trigger STa.

Now, if the magnitude of the current flowing through light-emitting diode LEDa is below a certain threshold level, Schmitt trigger STa receives an inadequate amount of light to become activated; which means that transistor Qta will be conductive, thereby to cause the DC voltage on energy-storing capacitor ESCa to be applied across primary winding PWa of transformer CSOT.

With the DC voltage from capacitor ESCa applied across primary winding PWa, forward (positive) base voltages/currents will be supplied to the bases of transistors Q1b and Q2a, thereby to render these transistors conductive. With these transistors conductive, the load current flowing into main terminal MT1 will flow through transistor Q1b to the negative side of energy-storing capacitor ESC (i.e., to the B− bus), from the positive side of energy-storing capacitor ESC (i.e., from the B+ bus), through transistor Q2a, and out of main terminal MT2.

Thus, the DC voltage present on energy-storing capacitor ESC will aid in causing the load current to flow, thereby causing it to increase in magnitude.

However, after a brief period, the magnitude of the load current will have increased enough to cause the intensity of the light provided by light-emitting dioded LEDa to Schmitt trigger STa to reach a level high enough to cause Schmitt trigger STa to become activated, thereby: i) to cause transistor Qta to become non-conductive, and ii) to remove the forward (positive) base voltages/currents from transistors Q1b and Q2a.

Thus, as soon as the magnitude of the load current increases enough to cause the magnitude of the current flowing through light-emitting diode LEDa to reach said certain threshold, transistors Q1b and Q2a become non-conductive; whereafter the load current will flow from main terminal MT1, through rectifier R1a, to the positive side of energy-storing capacitor ESC (i.e., to the B+ bus), from the negative side of energy-storing capacitor ESC (i.e., from the B− bus), through rectifier R2b, and out of main terminal MT2.

Thus, in this case, the load current will be forced to charge energy-storing capacitor ESC; which means that the DC voltage present on energy-storing capacitor ESC will impede the flow of load current, thereby causing its magnitude to decrease.

After a brief period, the magnitude of the load current will have decreased enough to cause the intensity of the light provided by light-emitting diode LEDa to Schmitt trigger STa to reach a level low enough to cause Schmitt trigger STa to become de-activated, thereby: i) to cause transistor Qta to become conductive again, and ii) to re-instate the forward (positive) base voltages/currents to transistors Q1b and Q2a.

In other words, the magnitude of the load current will be automatically controlled as indicated by the initial full half-cycle of the Ix waveform of FIG. 4g; and the voltages/currents correspondingly provided to transistors Q1b and Q2a will be as indicated by FIG. 4i. As indicated by the Vx waveform of FIG. 4g, the corresponding net voltage provided across the PIT terminals of the fluorescent lighting system will be the instantaneous sum of the power line voltage of FIG. 4a and the substantially squarewave voltage provided across main terminals MT1/MT2 of the control circuit—the peak absolute magnitude of this squarewave voltage being substantially equal to that of the DC voltage on energy-storing capacitor ESC.

For a situation where the load current is flowing in a direction opposite of that described above, the results are identical but obverse. That is: i) transistor Qb will be rendered conductive while transistor Qa will be rendered non-conductive, ii) the load current will activate light-emitting diode LEDb (instead of light-emitting diode LEDa), which will control Schmitt trigger STb, iii) Schmitt trigger STb will control transistor Qtb, and iv) transistor Qtb will operate to connect and disconnect the DC voltage on energy-storing capacitor ESCb with and from primary winding PWb of transformer CSOT, thereby to provide to transistors Q1a and Q2b the base voltages/currents indicated by the waveforms of FIG. 4h.

Hence, on a continuous basis, the load current will be as indicated by waveform Ix of FIG. 4g; and the voltage provided between power input terminals PIT of the fluorescent lighting system will be as indicated by waveform Vx of FIG. 4g.

Figure 6:
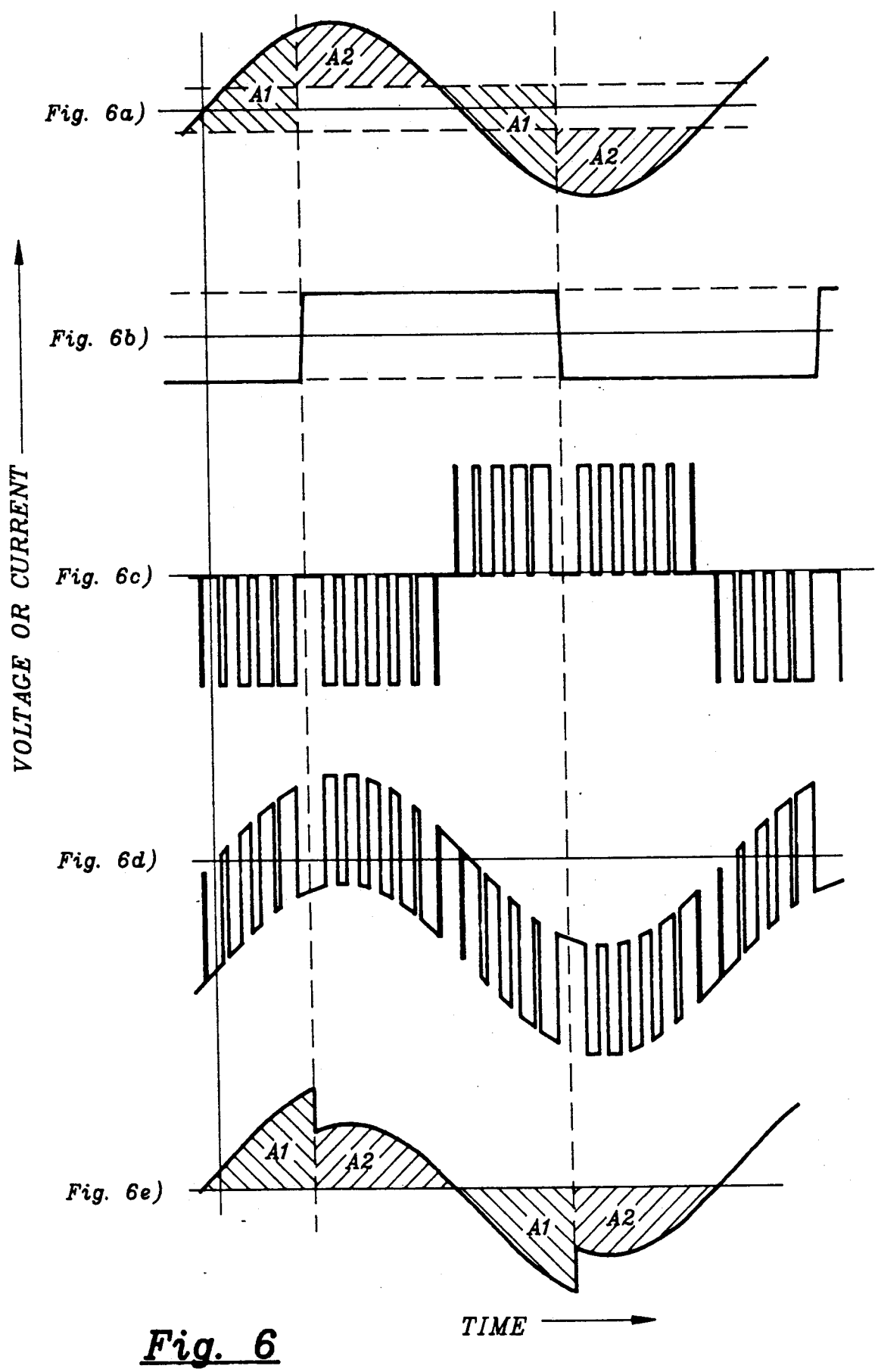
FIG. 6 depicts various waveforms associated with the preferred embodiment.

The operation of the preferred embodiment of FIG. 5 may best be understood when reading the following explanation in view of the waveforms of FIG. 6.

In FIG. 6, under a situation where general load means GLM is substantially resistive: a represents the 60 Hz power line voltage; b represents the current flowing through current-sensing terminals CST and thereby through energy-storing inductor ESI, general load means GLM, as well as source S; c represents the voltage present between junctions JQ1 and JQ2 (or JQ2'); d represents the sum of the power line voltage and the inverter's output voltage, which equals the voltage present between terminal PLT2 and junction JQ2 (or JQ2'); and e represents the voltage present between main terminals MT1 and MT2, which is identical to the voltage present between the OVMT terminal and one of the COT1a terminals.

In the circuit arrangement of FIG. 5, energy-storing capacitor ESC has a capacitance sufficiently large so that the DC voltage present across its terminals—for the current magnitudes and frequencies encountered in the normal course of operation of the circuit—remains substantially constant in magnitude from cycle-to-cycle of the power line voltage.

Energy-storing inductor ESI, on the other hand, has an inductance that—with the voltage magnitudes encountered in the normal course of operation of the circuit—permits the current flowing through it to vary substantially in magnitude from cycle-to-cycle of the power line voltage. More particularly, its inductance is of such magnitude as to tend to keep the magnitude of any current flowing through it substantially constant during a period of the switching frequencies associated with control means CM'; which period is very short compared with that of the power line voltage.

Switching controller SC' acts to turn transistors Q1a, Q1b, Q2a and Q2b ON and/or OFF in response to: i) a control signal provided at control input terminals CIT; ii) the magnitude of the current flowing through current-sensing terminals CST (which corresponds to the magnitude of the current flowing from main terminals MT1/MT2); iii) the polarity of the voltage present between main terminals MT1/MT2; and iv) the magnitude of the DC voltage present between the B− bus and the B+ bus.

In particular and by way of example, the control signal provided at control input terminals CIT could be a fixed DC voltage level indicative of the absolute magnitude to which the current flowing through current-sensing terminals CST will automatically be adjusted by action of switching controller SC'. However, for a more sophisticated manner of control, the control signal could be a time-varying voltage level, thereby to cause the absolute magnitude of the current flowing through current-sensing terminals CST to become correspondingly time-varying.

The waveforms of FIG. 6 correspond to a situation where: i) the magnitude of the DC voltage present between the B− bus and the B+ bus is maintained equal to about twice the average absolute magnitude of the power line voltage; and ii) the signal provided to control input terminals CIT represents a fixed DC voltage level. That is, the switching controller will attempt to regulate the absolute magnitude of the inverter's output current to a fixed level, while maintaining the magnitude of the DC voltage across energy-storing capacitor ESC at a level approximately equal to twice the average absolute magnitude of the AC voltage supplied from source S.

The fixed level to which the switching controller will regulate the absolute magnitude of the inverter's output current is indicated by the two dashed lines of FIG. 6b. This absolute magnitude level corresponds to the magnitude of the current that would have resulted had a voltage of fixed absolute magnitude about equal to that indicated by the dashed lines of FIG. 6a (i.e., about one quarter of the peak magnitude of the power line voltage) been applied directly across load GLM. That is, the absolute magnitude of the voltage present across load GLM is about one quarter of the absolute peak magnitude of the power line voltage.

The phasing of the resulting nearly squarewave load current will adjust itself such that the area indicated as A1 in FIG. 6a becomes equal to the area indicated as A2; which implies that—for each half-cycle of the power line voltage—as much charge is supplied to energy-storing capacitor ESC as is removed therefrom.

More particularly, since the absolute instantaneous magnitude of the output current is kept constant, area A1 constitutes a measure of the amount of energy delivered by energy-storing capacitor ESC during each half-cycle of the power line voltage, while area A2 constitutes a measure of the amount of energy received by energy-storing capacitor ESC during each half-cycle. Area A1 consists of two parts: a first part representing the amount of energy supplied from energy-storing capacitor ESC to the load during each half-cycle, and a second part representing the amount of energy supplied from energy-storing capacitor ESC to the power line during each half-cycle.

More particularly, switching controller SC'—which preferably is an integrated circuit—is designed to provide for the following function:

(1) Whenever the polarity of the potential at the ONMT terminal becomes negative with respect to that of the lower one of the two COT1a terminals (i.e., junction JQ1), switching controller SC' provides outputs from control output terminals COT1a and COT1b to cause transistors Q1a and Q1b to enter their ON and OFF states, all respectively, and to remain in those states for as long as this polarity remains negative.

(2) Whenever the polarity of the potential at the ONMT terminal becomes positive with respect to that of the lower one of the two COT1a terminals, switching controller SC' causes transistors Q1a and Q1b to reverse their states of conduction (i.e., to enter their OFF and ON states, respectively) and to remain in those states until the polarity again reverses.

(3) Immediately after transistor Q1b has been switched into its ON state (i.e., after transistor Q1a has been switched out of its ON state), switching controller SC' starts to control the absolute magnitude and the polarity of the current flowing through current sensing terminals CST (i.e., the output current) by way of: (i) causing, initially transistor Q2a, subsequently transistor Q2b, to switch ON intermittently and in such manner as to maintain the absolute magnitude of the output current at or near a substantially constant preset level; and (ii) providing for a polarity reversal of the output current at such point in time that the amount of charge drained from energy-storing capacitor ESC during the initial period (when transistor Q2a is in the state of intermittent ON-switching) is exactly replaced during the subsequent period (when transistor Q2b is in the state of intermittent ON-switching)—that is, before the polarity of the potential at the ONMT terminal reverses.

(4) More particularly and on an instantaneous basis, with transistor Q1b in its ON state, as soon as the magnitude of the output current decreases below a certain lower level, transistor Q2a is switched ON, thereby to add the voltage of energy-storing capacitor ESC to that of source S, thereby to cause the magnitude of the output current to increase. As soon as the magnitude of the output current has increased to a certain higher level, transistor Q2a is switched OFF; which then causes the magnitude of the output current to decrease, eventually again to reach the certain lower level; at which point transistor Q2a again is switched ON; etc.

(5) Still with transistor Q1b in its ON state, after a certain period of time—subsequent to the most recent point in time when transistor Q1b was brought into its ON state—the intermittent ON-switching of transistor Q2a is stopped and transistor Q2b is caused to switch ON. Now, with it no longer prevented from falling below said lower level, the magnitude of the output current fall rapidly, eventually to reverse direction and—now flowing through transistor Q2b—again to grow in magnitude, but in the opposite direction. However, transistor Q2b switches OFF each time the (now reversed) current magnitude reaches said certain higher level and switches back ON again each time it falls below said certain lower level; which means that the absolute magnitude of the output current will again be maintained at said substantially constant preset level; which constant preset level is determined by the magnitude of a control voltage applied to control input terminals CIT.

(6) When again the polarity of the potential at the ONMT terminal becomes negative with respect to that of the lower one of the two CTO1a terminals, transistor Q1a is again caused to enter its ON state; whereafter the functions defined in sections (3) to (5) above are repeated in an obverse manner.

Key features of, and the basic principle underlying, the circuit of FIG. 5 are identified as follows.

(7) The certain period of time referred-to in item (5) above is pre-arranged to be approximately 4.5 millisecond; which corresponds to slightly more than half the duration of a half-cycle of a 60 Hz power line voltage. However, this duration—which corresponds to the length of the base-line of area A1 in FIG. 6a—will automatically be shortened during circuit operation, thereby to increase area A2 at the expense of area A1; which shortening will go on until area A2 equals area A1, as determined by a time-integrating means built into switching controller SC'. Clearly, means to adjust the duration of said certain period of time can be provided, thereby to permit accomodation of different source frequencies.

(8) The average absolute magnitude of the voltage provided by source S must generally be larger than (or at least as large as) that required to be provided across general load means GLM.

(9) The magnitude of the DC voltage developing across energy-storing capacitor ESC depends on the particular requirements and/or the particular limitations of the situation at hand. Generally, in order to provide for adequate control flexibility, the absolute magnitude of this DC voltage should be equal to at least twice the average absolute magnitude of the voltage provided by source S.

(10) The magnitude of the DC voltage on capacitor ESC is determined by switching controller SC' in that the operation of this controller is so biased as to cause the magnitude of this DC voltage to rise until it reaches a level that is preset (via a Zener diode means) within controller SC'. This effect is attained by including a provision in switching controller SC' to cause area A2 in the waveform of FIG. 6a to increase relative to area A1 until the DC voltage reaches the desired magnitude.

(11) The inductance of inductor ESI must be matched to the maximum acceptable frequency of operation of transistors Q2a and Q2b; which, for commonly available devices of appropriate characteristics, may reasonably be as high as 40 kHz.

(12) It is emphasized that the waveshape of the output current can—within a very wide range—be made to be whatever might be desired. In fact, depending on the algorithm built into the switching controller, it is not even necessary for the frequency of the output current to be the same as that of the source voltage.

(13) A basic principle of the operation of the circuit of FIG. 5 relates to the simple fact that energy-storing capacitor ESC is charged (by forward conversion) during periods when the magnitude of the source voltage is larger than the voltage magnitude required by the load. On the other hand, during periods when the magnitude of the source voltage falls short of the voltage magnitude required by the load, energy is extracted from energy-storing capacitor ESC so as to make up for the short-fall.

Additional Explanations and Comments a) In the arrangement of FIG. 1, depending upon the magnitude of the power line voltage, as well as on the exact values and adjustments of the various circuit and system components, there may be a net current flowing out of energy-storing capacitor ESC. However, any lost charge will automatically be replenished by way of auxiliary voltage transformer AVT and auxiliary rectifier Rax.

However, in most situations the voltage on energy-storing capacitor ESC will adjust itself to a point where no net charge will flow out of it or into it; which means that, in and for most situations, auxiliary voltage transformer AVT and auxiliary rectifier AR may may be eliminated.

Moreover, as indicated in FIG. 3, it is possible also to eliminate voltage transformer VT and to provide the requisite input voltage to control input terminals CIT1 from an extra winding on current transformer CT; in which case the complete control means (CM') becomes a completely self-contained two-terminal device.

b) In some situations it might be undesirable to apply the relatively high-frequency squarewave voltage components of waveform Vx of FIG. 4g directly to the power input terminals (PIT) of a load; which load, of course, may not necessarily be a fluorescent lighting system. In those situations, much of the high-frequency components can be filtered away by placing an inductor in series with main terminals MT1/MT2.

c) In the arrangement of FIGS. 1 and 3, by adjusting the value of adjustable resistor AR, the magnitude of the load current can be correspondingly adjusted: a reduced value of AR requires an increased magnitude of load current to activate the Schmitt triggers.

d) With the basic control means of FIGS. 1 and 3, depending only on the detailed design of the switching controller (SC), different forms of control patterns can readily be attained.

Basically, control means CM can at any time provide for: i) the addition to the power line voltage of a fixed-magnitude voltage, ii) the subtraction from the power line voltage of that same fixed-magnitude voltage, and iii) the free passage of current to the load without adding or subtracting any voltage.

e) In control means CM of FIGS. 1 and 3, energy-storing capacitor ESC is of such capacitance as to store an amount of energy that is large compared with the largest amount of energy it might have to absorb and/or deliver during any one complete half-cycle of the power line voltage.

However, in some circumstances it would be desirable to use an energy-storing capacitor of much smaller capacitance, thereby providing for a situation where the magnitude of the DC voltage on this capacitor would vary significantly in response to its normal inflows and outflows of current.

f) The waveshape of the Ix-current of FIG. 4g has a much lower crest factor than that of the Io-current of FIG. 4b; which Io-current is the current that would be flowing to the fluorescent lighting system (FLS of FIGS. 1 or 3) if it were connected directly to the power line voltage of FIG. 4a.

The lower crest factor is desirable in terms of providing for improved efficacy in the operation of fluorescent lamps.

(The crest factor of a waveform is defined as the ratio between the peak and the RMS magnitudes of the waveform.

g) With reference to FIGS. 1 and 3, it is noted that the series-combination of source S and fluorescent lighting system FLS may be considered as a load for control means CM.

Or, from another viewpoint, the series-combination of source S and fluorescent lighting means FLM may be considered as a source of voltage having an internal impedance consisting of the series-combination of L, C and FL.

h) The Vx-waveform of FIG. 4g has a fundamental frequency equal to that of power line voltage Vp1 of FIG. 4a.

i) The peak magnitude of the Vx-current of FIG. 4g may be adjusted by way of adjustable resistor AR of FIGS. 1 and 3.

j) With respect to the arrangement of FIG. 5, it is noted that the absolute magnitude of the inverter output voltage—as provided at the output of the inverter, that is, between unctions JQ1 and JQ2"—is either zero or substantially equal to the absolute magnitude of the DC voltage present between the B− bus and the B+ bus. More particularly, the inverter output voltage alternates between zero and the absolute magnitude of the DC voltage at a rate much higher than the frequency of the AC voltage of source S. Thus, the inverter output voltage contains harmonics of frequencies much higher than the frequency of the AC voltage provided from source S.

k) The load current depicted in FIG. 6b is of such symmetrical waveform as to be substantially void of even harmonics of the fundamental frequency of the AC voltage provided by source S. Instead, like a squarewave, the waveform of FIG. 4b is made up entirely of odd harmonics of the fundamental frequency of this AC voltage.

l) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   a source of AC voltage having a first and a second source terminal;
   load means having a first and a second load terminal; the first load terminal being connected with the first source terminal; and
   an inverter means having a first and a second inverter terminal; the first inverter terminal being connected with the second load terminal; the second inverter terminal being connected with the second source terminal.

2. The arrangement of claim 1 wherein the inverter means comprises energy-storing means.

3. The arrangement of claim 2 wherein the energy-storing means receives and supplies energy at least once during each half-cycle of the AC voltage.

4. The arrangement of claim 1 wherein the inverter is characterized by intermittently adding a voltage to said AC voltage, thereby intermittently providing a voltage across the load terminals having a magnitude that is larger than that of the AC voltage.

5. The arrangement of claim 1 wherein the voltage provided across the load terminals comprises components having frequencies substantially higher than those present in the AC voltage.

6. The arrangement of claim 1 wherein: (i) a load current is flowing through the load means; (ii) the load current has a waveshape different from that of the AC voltage; and (iii) the waveshape consists of alternating positive and negative half-cycles, each half-cycle having a mid-point and being symmetrical with respect to that mid-point.

7. The arrangement of claim 1 wherein the inverter means comprises four transistors connected in bridge configuration.

8. The arrangement of claim 7 wherein each transistor is parallel-connected with a rectifier means.

9. An arrangement comprising:
   energy-storing means having a pair of DC terminals across which there exists a DC voltage;
   inverter means connected with the DC terminals; the inverter means having a pair of inverter output terminals; and
   a load and a source of AC voltage series-connected across the inverter output terminals.

10. The arrangement of claim 9 wherein any energy supplied to the load is provided from the source of AC voltage.

11. The arrangement of claim 9 wherein an inverter output voltage exists across the inverter output terminals; the inverter output voltage being characterized by having a magnitude that is either: (i) of positive polarity and a first absolute magnitude; or (ii) of negative polarity and a second absolute magnitude; or (iii) of zero magnitude.

12. The arrangement of claim 11 wherein the first absolute magnitude is about equal to the second absolute magnitude.

13. The arrangement of claim 9 wherein an inverter output voltage exists across the inverter output terminals; the instantaneous absolute magnitude of the inverter output voltage alternating between being of zero magnitude and being of an absolute magnitude equal to that of the DC voltage.

14. The arrangement of claim 9 wherein the energy-storing means at certain times receives energy from the source of AC voltage, and at certain other times supplies energy to the load.

15. The arrangement of claim 9 wherein the energy-storing means at certain times supplies energy to the inverter output terminals and at certain other times receives energy from the inverter output terminals.

16. The arrangement of claim 15 wherein, as averaged over a full period of the AC voltage, the amount of energy supplied by the energy-storing means to the inverter output terminals equals the amount of energy received by the energy-storing means from the inverter output terminals.

17. The arrangement of claim 9 wherein the magnitude of the DC voltage approximately equals twice the average absolute magnitude of the AC voltage.

18. An arrangement comprising:
   a source of AC voltage having a pair of AC terminals;
   load means having a pair of load terminals; a load current flowing through the load means;
   control means having a pair of control terminals; and
   connect means operative to connect the load means in series with the source and the control means, such that all of the load current flows through (i) the source via its AC terminals; as well as (ii) through the control means via its control terminals;
   the control means being operative to control the magnitude and/or the waveshape of the load current; a control voltage being present across the control terminals; the absolute instantaneous magnitude of the control voltage alternating abruptly between zero and a substantially fixed level.

19. The arrangement of claim 18 wherein the control means comprises energy-storing means.

20. The arrangement of claim 19 wherein the energy-storing means comprises an energy-storing capacitor.

21. The arrangement of claim 18 wherein the control means performs its defined function without requiring any substantive degree of power dissipation.

22. The arrangement of claim 18 wherein the load means comprises energy-storing inductor means.

23. The arrangement of claim 18 wherein the control means comprises four transistors connected in a bridge configuration.

24. The arrangement of claim 23 wherein a rectifier is connected in parallel with at least two of the four transistors.

25. The arrangement of claim 18 wherein the control means comprises: (i) a source of DC voltage; and (ii) an inverter means connected in circuit between the DC voltage source and the control terminals.

26. The arrangement of claim 25 wherein the inverter means includes a bridge inverter having four transistors.

27. The arrangement of claim 18 wherein the source of AC voltage is an ordinary electric utility power line.

* * * * *